US008909166B2

(12) United States Patent
Park et al.

(10) Patent No.: US 8,909,166 B2
(45) Date of Patent: Dec. 9, 2014

(54) METHOD AND APPARATUS FOR CONTROLLING MULTI BAND ANTENNA IN MOBILE COMMUNICATION TERMINAL

(75) Inventors: Jung-Ho Park, Hwaseong-si (KR); Sung-Hwan Ko, Suwon-si (KR); Suk-Chan Hong, Gumi-si (KR); Young-Hwan Jung, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 556 days.

(21) Appl. No.: 13/170,474

(22) Filed: Jun. 28, 2011

(65) Prior Publication Data

US 2011/0319038 A1 Dec. 29, 2011

(30) Foreign Application Priority Data

Jun. 29, 2010 (KR) ........................ 10-2010-0061657

(51) Int. Cl.
*H04B 1/00* (2006.01)
*H01Q 1/24* (2006.01)

(52) U.S. Cl.
CPC ..................................... *H01Q 1/242* (2013.01)
USPC ............. 455/78; 455/296; 455/284; 455/121; 455/324; 455/77; 343/702; 343/745; 343/876; 370/478; 370/468; 370/330

(58) Field of Classification Search
USPC ............. 455/296, 284, 121, 324, 77, 78, 550, 455/575, 73, 101, 127.1, 114.3; 343/702, 343/745, 876; 370/478, 468, 330
See application file for complete search history.

(56) References Cited

U.S. PATENT DOCUMENTS

| | | | | |
|---|---|---|---|---|
| 6,535,239 | B1 * | 3/2003 | Kim | 348/14.02 |
| 2002/0183013 | A1 | 12/2002 | Auckland et al. | |
| 2003/0153348 | A1 | 8/2003 | Lahlum et al. | |
| 2003/0219035 | A1 * | 11/2003 | Schmidt | 370/478 |
| 2005/0143026 | A1 * | 6/2005 | Bellantoni | 455/121 |
| 2006/0160503 | A1 * | 7/2006 | Ichitsubo et al. | 455/127.1 |
| 2007/0111697 | A1 * | 5/2007 | Bellantoni | 455/324 |
| 2008/0089433 | A1 * | 4/2008 | Cho et al. | 375/267 |
| 2008/0106476 | A1 * | 5/2008 | Tran et al. | 343/702 |
| 2008/0150700 | A1 * | 6/2008 | Lee et al. | 340/10.4 |
| 2008/0158076 | A1 | 7/2008 | Walley | |
| 2009/0093228 | A1 * | 4/2009 | Rostami et al. | 455/284 |
| 2011/0045786 | A1 * | 2/2011 | Leinonen et al. | 455/78 |

FOREIGN PATENT DOCUMENTS

| | | | |
|---|---|---|---|
| EP | 1 553 658 | A1 | 7/2005 |
| KR | 10-2006-0096679 | A | 9/2006 |
| WO | 2008/055039 | A3 | 5/2008 |

* cited by examiner

*Primary Examiner* — Ganiyu A Hanidu
(74) *Attorney, Agent, or Firm* — Jefferson IP Law, LLP

(57) ABSTRACT

An apparatus and method for controlling a multi-band antenna in a mobile communication terminal are provided. An apparatus for controlling a multi-band antenna in a mobile communication terminal includes a modem, an antenna unit, a Radio Frequency (RF) processing unit, and a switch module. The modem outputs at least one control signal corresponding to a target frequency band. The antenna unit changes a resonance frequency of the antenna according to the at least one control signal. The RF processing unit includes a plurality of transmission/reception (TX/RX) paths and processes TX/RX signals. The switch module connects the antenna to one of the TX/RX paths according to the at least one control signal.

12 Claims, 6 Drawing Sheets

501 503

| MODE | Vc1 | Vc2 | Vc3 | Vc4 |
|---|---|---|---|---|
| GSM850/900 TX | HIGH | LOW | LOW | LOW |
| GSM1800/1900 TX | HIGH | HIGH | LOW | LOW |
| GSM850 RX | LOW | LOW | HIGH | LOW |
| GSM900 RX | LOW | HIGH | HIGH | LOW |
| GSM1800 RX | LOW | LOW | LOW | LOW |
| GSM1900 RX | LOW | HIGH | LOW | LOW |
| UMTS1 | LOW | LOW | LOW | HIGH |
| UMTS2 | LOW | HIGH | LOW | HIGH |
| UMTS3 | LOW | LOW | HIGH | HIGH |

601 603

| MODE | CTRL1 | CTRL2 | CTRL3 | CTRL4 |
|---|---|---|---|---|
| GSM850/EGSM TX | 1 | 1 | 0 | 0 |
| PCN/PCS TX | 1 | 0 | 0 | 0 |
| WB850 | 0 | 1 | 0 | 1 |
| WB1900 | 0 | 0 | 0 | 1 |
| WB2100 | 0 | 0 | 1 | 1 |
| GSM850 RX | 0 | 1 | 1 | 0 |
| EGSM RX | 0 | 0 | 1 | 0 |
| PCN RX | 0 | 1 | 0 | 0 |
| PCS RX | 0 | 0 | 0 | 0 |

METHOD AND APPARATUS FOR CONTROLLING MULTI BAND ANTENNA IN MOBILE COMMUNICATION TERMINAL

PRIORITY

This application claims the benefit under 35 U.S.C. §119 (a) of a Korean patent application filed in the Korean Intellectual Property Office on Jun. 29, 2010 and assigned Serial No. 10-2010-0061657, the entire disclosure of which is hereby incorporated by reference.

BACKGROUND OF THE INVENTION

1. Field of the Invention

The present invention relates to a method and apparatus for controlling a multi-band antenna in a mobile communication terminal. More particularly, the present invention relates to a method and apparatus for controlling the resonance frequency of a multi-band antenna in a mobile communication terminal.

2. Description of the Related Art

Communication technology developments have resulted in mobile communication terminals that support a plurality of frequency bands while using one antenna. A mobile communication terminal of the related art varies the resonance frequency of an antenna using a switch to transmit/receive signals of multiple frequency bands.

FIG. 1 is a block diagram of a mobile communication terminal of the related art.

Referring to FIG. 1, the mobile communication terminal of the related art includes a control unit 100, a Radio Frequency (RF) unit 110, and a switch 120. The control unit 100 performs a function for changing a current frequency band according to a technique of the related art. The control unit 100 determines whether to change the current frequency band, according to a region where the mobile communication terminal is located. If the current frequency band is to be changed, the control unit 100 outputs a band control signal for processing a signal corresponding to a target frequency band, to the RF unit 110 and provides a switching control signal for switching to the target frequency band, to the switch 120. According to the switching control signal, the switch 120 changes the resonance frequency of an antenna so that the antenna can transmit/receive signals of the target frequency band. According to the band control signal, the RF unit 110 processes a signal corresponding to the target frequency band, in the signal received from the antenna.

As described above, the mobile communication terminal of the related art has two output ports for outputting the band control signal and the switching control signal generated by the control unit 100 to change the current frequency band, performs a separate operation for generating each of the two control signals, and performs time synchronization between the two control signals. Thus, it is difficult to use the above technique in a mobile communication terminal that has no available ports in a modem chip serving as the control unit. Also, as compared to other techniques of the related art, the above technique increases the operation load of the mobile communication terminal and may be difficult to produce and develop.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages below. Accordingly, an aspect of the present invention is to provide a method and apparatus for controlling a resonance frequency of a multi-band antenna in a mobile communication terminal.

Another aspect of the present invention is to provide a method and apparatus for controlling a transmission/reception (TX/RX) path and an antenna resonance frequency in a mobile communication terminal by using one control signal.

Another aspect of the present invention is to provide a method and apparatus for sharing a control signal between a Radio Frequency (RF) switching module for determining a TX/RX path, and a switch for varying the resonance frequency of an antenna, in a mobile communication terminal.

According to an aspect of the present invention, an apparatus for controlling a multi-band antenna in a mobile communication terminal is provided. The apparatus includes a modem for outputting at least one control signal corresponding to a target frequency band, an antenna unit for changing a resonance frequency of the antenna according to the at least one control signal, a Radio Frequency (RF) processing unit including a plurality of TX/RX paths for processing TX/RX signals, and a switch module for connecting the antenna to one of the TX/RX paths according to the at least one control signal.

According to another aspect of the present invention, a method for controlling a multi-band antenna in a mobile communication terminal is provided. The method includes outputting, by a modem, at least one control signal corresponding to a target frequency band, changing, by an antenna unit, a resonance frequency of the antenna according to the at least one control signal, and connecting, by a switch module, the antenna to one of a plurality of TX/RX paths according to the at least one control signal.

Other aspects, advantages, and salient features of the invention will become apparent to those skilled in the art from the following detailed description, which, taken in conjunction with the annexed drawings, discloses exemplary embodiments of the invention

BRIEF DESCRIPTION OF THE DRAWINGS

The above and other aspects, features, and advantages of certain exemplary embodiments of the present invention will become more apparent from the following description taken in conjunction with the accompanying drawings, in which.

Throughout the drawings, like reference numerals will be understood to refer to like parts, components and structures

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions or constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention provide a method and apparatus for controlling a transmission/reception (TX/RX) path and an antenna resonance frequency in a mobile communication terminal by using one control signal.

Figure 1:
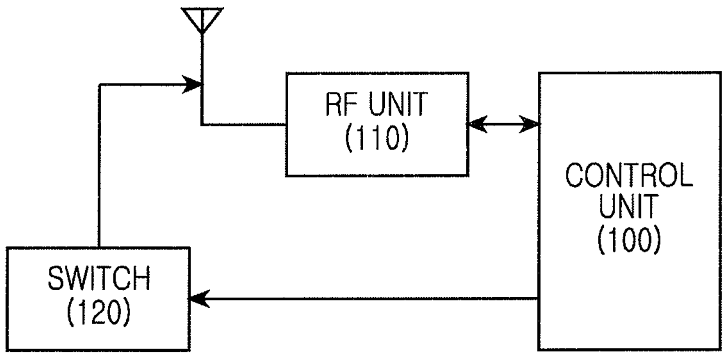
FIG.1 (RELATED ART)
FIG. 1 is a block diagram of a mobile communication terminal of the related art.
Figure 2:
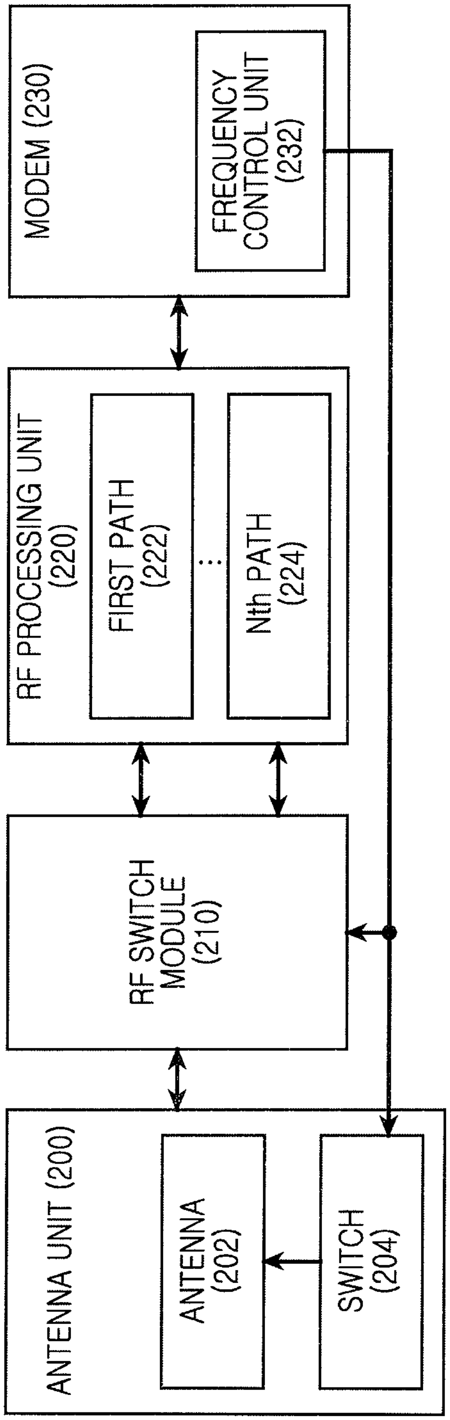
FIG. 2 is a block diagram of a mobile communication terminal according to an exemplary embodiment of the present invention.

FIG. 2 is a block diagram of a mobile communication terminal according to an exemplary embodiment of the present invention.

Referring to FIG. 2, a mobile communication terminal according to an exemplary embodiment of the present invention includes an antenna unit 200, a Radio Frequency (RF) switch module 210, an RF processing unit 220, and a modem 230. The antenna unit 200 includes an antenna 202 and a switch 204. The RF processing unit 220 includes N number of paths 222 and 224. The modem 230 includes a frequency control unit 232.

The antenna unit 200 varies a resonance frequency according to a control signal received from the modem 230, to transmit/receive an RF signal corresponding to a target frequency band.

The switch 204 of the antenna unit 200 changes the resonance frequency of the antenna 202 by performing a switching operation according to a control signal received from the modem 230. The switch 204 may receive the same control signal as the RF switch module 210 by receiving the control signal through a signal line branching from a signal line through which the modem 230 provides the control signal to the RF switch module 210. If the modem 230 provides control signals to the RF switch module 210 through a plurality of signal lines, the switch 204 may receive a result signal obtained by using a logic circuit (e.g., an AND gate or a NOR gate) to combine a plurality of signal lines branching from the above signal lines. An example of changing the resonance frequency of the antenna 202 is described below with reference to FIGS. 4 through 6B.

Figure 4:
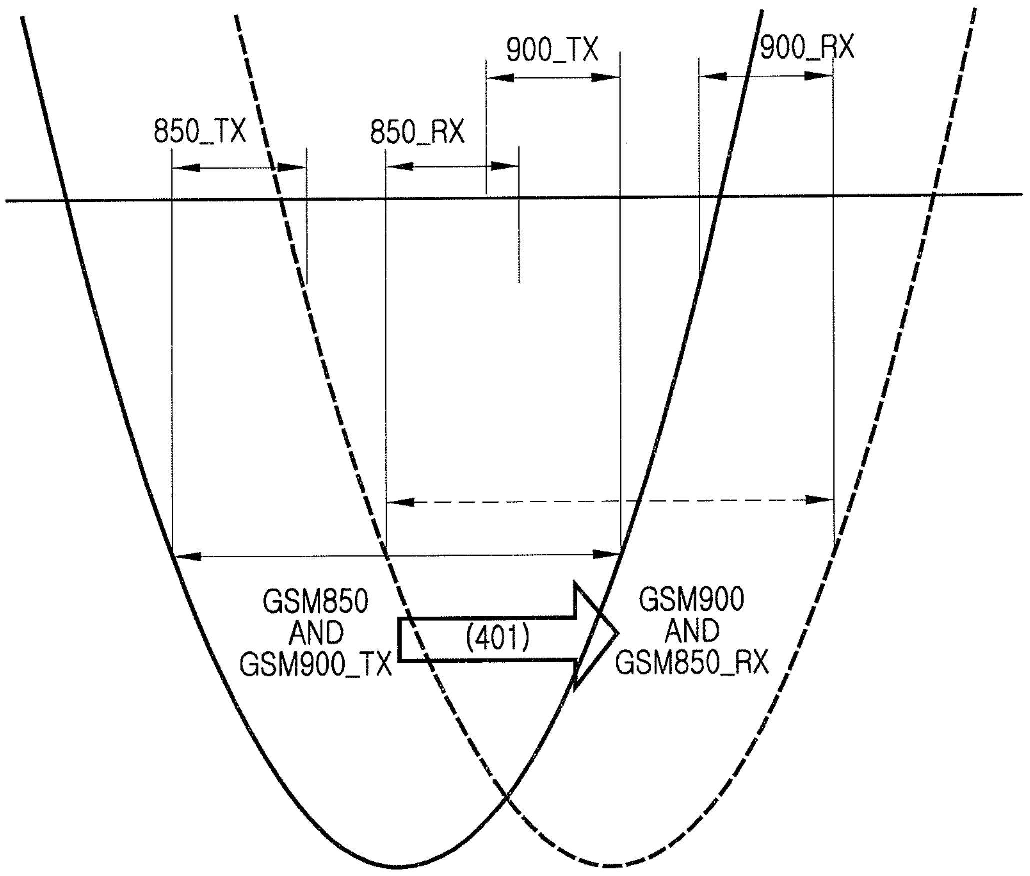
FIG. 4 is a diagram illustrating a change of a frequency band under the control of a switch in a mobile communication terminal according to an exemplary embodiment of the present invention.
Figures 5A, 5B:
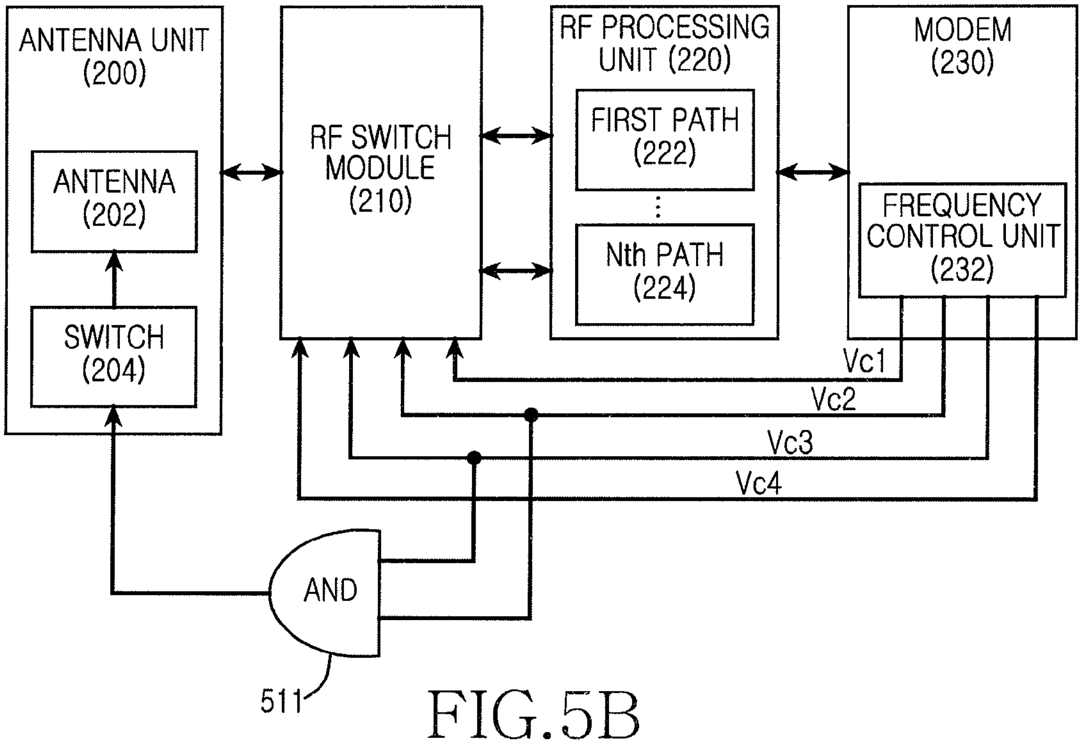
FIGS. 5A and 5B are diagrams illustrating schemes for changing a frequency band by a logic element in a mobile communication terminal according to an exemplary embodiment of the present invention.
Figures 6A, 6B:
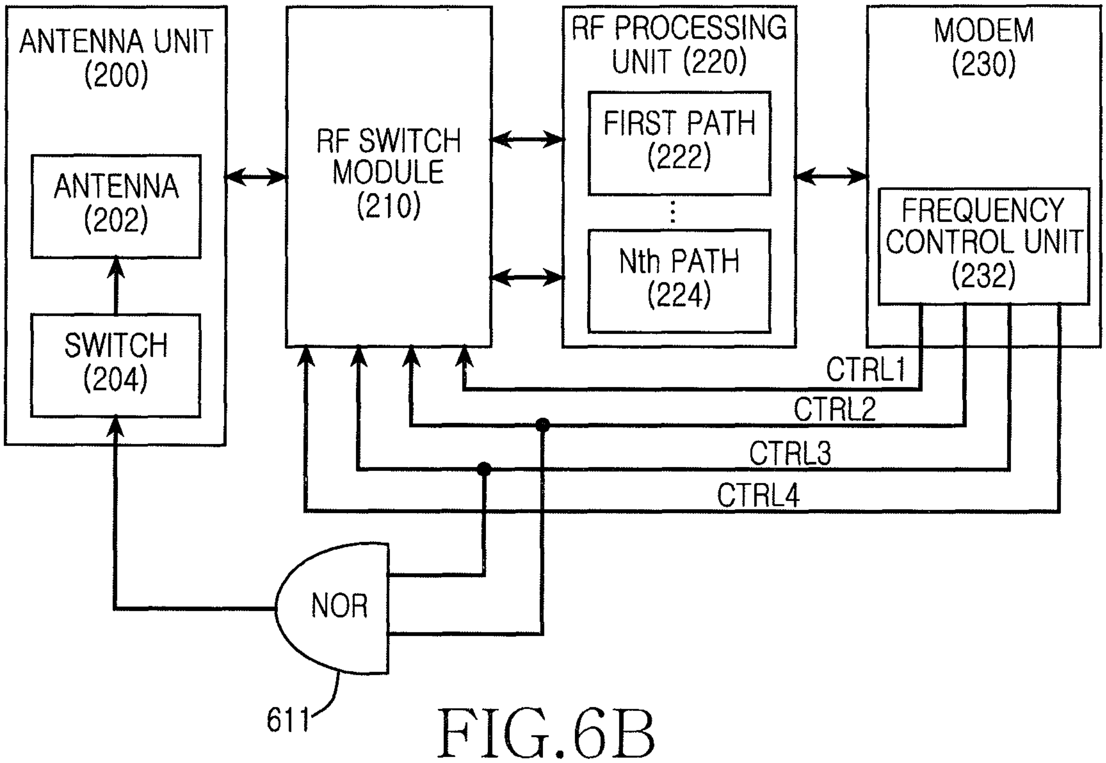
FIGS. 6A and 6B are diagrams illustrating schemes for changing a frequency band by a logic element in a mobile communication terminal according to an exemplary embodiment of the present invention.

FIG. 4 is a diagram illustrating a change of a frequency band under the control of a switch in a mobile communication terminal according to an exemplary embodiment of the present invention. FIGS. 5A and 5B are diagrams illustrating schemes for changing a frequency band by a logic element in a mobile communication terminal according to an exemplary embodiment of the present invention. FIGS. 6A and 6B are diagrams illustrating schemes for changing a frequency band by a logic element in a mobile communication terminal according to an exemplary embodiment of the present invention.

Referring to FIGS. 4, 5B and 6B, if the mobile communication terminal is to change the frequency band from GSM850 to GSM900 as denoted by arrow 401 illustrated in FIG. 4, the switch 204 may receive the control signal through an AND gate 511 or a NOR gate 611 as illustrated in FIGS. 5B and 6B. FIGS. 5A, 5B, 6A and 6B illustrate schemes for changing the frequency band by an AND gate 511 and a NOR gate 611 in the mobile communication terminal according to an exemplary embodiment of the present invention. FIGS. 5A, 5B, 6A and 6B illustrate an exemplary case where the modem 230 outputs signals to the RF switch module 210 through four signal lines. As illustrated in FIG. 5A, if the mobile communication terminal is to change the frequency band to GSM900, the modem 230 may be designed to output a signal low/high/high/low through a signal line Vc1/Vc2/Vc3/Vc4. In this case, as illustrated in FIG. 5B, the mobile communication terminal may further include an AND gate 511 for performing an AND operation on two signals received from the signal lines Vc2 501 and Vc3 503 and providing the operation result to the switch 204, so that the switch 204 changes a ground point of the antenna 202 according to an output signal of the AND gate 511 to enable the use of a GSM900 band.

As illustrated in FIG. 6A, if the mobile communication terminal is to change the frequency band to EGSM900, the modem 230 may be designed to output a signal low/low/high/low through a signal line CTRL1/CTRL2/CTRL3/CTRL4. In this case, as illustrated in FIG. 6B, the mobile communication terminal may further include a NOR gate 611 for performing a NOR operation on two signals received from the signal lines CTRL1 601 and CTRL2 603 and providing the operation result to the switch 204, so that the switch 204 changes a ground point of the antenna 202 according to an output signal of the NOR gate 611 to enable the use of an EGSM900 band.

Adding an AND gate or a NOR gate according to the values of signals outputted through signal lines as illustrated in FIGS. 5A, 5B, 6A and 6B are merely exemplary embodiments of the present invention, and the mobile communication terminal may further include other logic circuits according to various embodiments. Also, the mobile communication terminal may further include a plurality of logic circuits. Although it has been described that the logic circuit is designed to consider only one frequency band, the logic circuit may also be designed to consider all frequency bands supported by the mobile communication terminal.

An operation of changing the resonance frequency of the antenna 202 by the switch 205 may be performed using a scheme of the related art such as an impedance matching scheme. For example, the switch 205 may change the ground condition of the antenna 202 to change the resonance frequency of the antenna 202. The antenna 202 receives an RF signal corresponding to the target frequency band by using the resonance frequency changed according to a switching operation of the switch 204, and provides the received RF signal to the RF switch module 210. Also, the antenna 202 receives a signal from the RF switch module 210 and transmits the received signal by radio.

According to a control signal received from the modem 230, the RF switch module 210 performs a switching operation to connect the antenna unit 200 and the RF processing unit 220. According to the control signal, the RF switch module 210 connects the antenna unit 200 to one of a plurality of TX/RX paths included in the RF processing unit 220. Herein, the control signal may comprise as many bits as the number of the TX/RX paths to indicate which of the TX/RX paths the antenna unit 200 will be connected to. For example, if the RF processing unit 220 includes four TX paths or four RX paths, when receiving a control signal '0100' from the modem 230, the RF switch module 210 may connect the antenna unit 200 to the path corresponding to the second bit among the four TX paths or the four RX paths. Also, a plurality of signal lines corresponding to the TX/RX paths may be disposed between the RF switch module 210 and the modem 230 to provide a signal indicating which of the TX/RX paths the antenna unit 200 will be connected to.

The RF processing unit 220 including the N paths 222 and 224 receives baseband signals from the modem 230, modulates/encodes/converts the baseband signals into RF signals, and provides the RF signals to the RF switch module 210. Also, the RF processing unit 220 receives RF signals from the antenna unit 200 through the RF switch module 210, converts the RF signals into baseband signals, decodes/demodulates the baseband signals, and provides the resulting signals to the modem 230. Herein, the N paths 222 and 224 may include at least one TX path and at least one RX path for processing an RX signal received from the antenna unit 200, and may process signals of different frequency bands.

The modem 230 performs an overall communication operation (e.g., a voice call, a data communication, and a wireless Internet connection) of the mobile communication terminal. According to the present exemplary embodiment, the modem 230 includes a frequency control unit 232 to control and process a function for changing the current frequency band. The frequency control unit 232 determines whether a predetermined condition for changing the current frequency band is satisfied. If the predetermined condition is satisfied, the frequency control unit 232 determines a target frequency band and outputs a control signal corresponding to the target frequency band through one output port to the RF switch module 210 and the switch 204. The control signal outputted from the frequency control unit 232 may be implemented as illustrated in FIG. 5A or 5B. In this case, as illustrated in FIG. 5A or 5B, the frequency control unit 232 may output the control signal through a plurality of signal lines connected to the RF switch module 210. Herein, whether to change the current frequency band may be determined by determining whether the time, the quality of an RX signal, and the location of the mobile communication terminal satisfy a predetermined condition, or may be determined by determining whether a service is provided using the frequency band.

Figure 3:
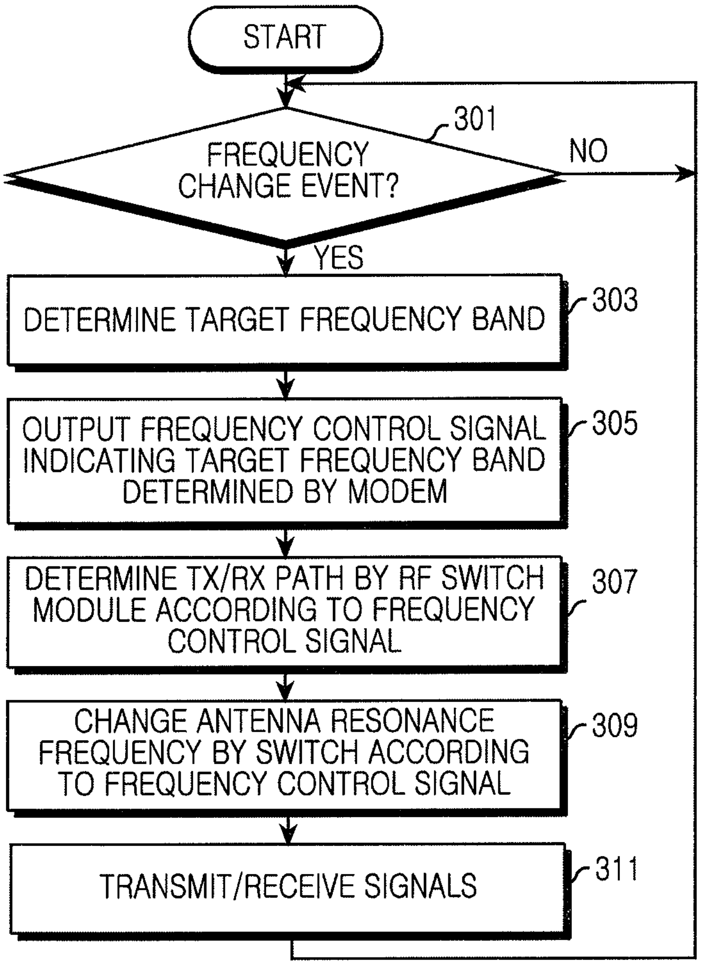
FIG. 3 is a flow diagram illustrating a process for changing a frequency band in a mobile communication terminal according to an exemplary embodiment of the present invention.

FIG. 3 is a flow diagram illustrating a process for changing a frequency band in a mobile communication terminal according to an exemplary embodiment of the present invention.

Referring to FIG. 3, in step 301, the mobile communication terminal determines whether a frequency change event occurs. The modem may determine whether a frequency change event occurs. Herein, whether the frequency change event occurs may be determined by determining whether a predetermined condition is satisfied or whether a service is provided using the frequency band. If a frequency change event is not determined to have occurred, the mobile communication terminal repeats step 301 and again determines whether a frequency change event occurs.

If a frequency change event is determined to have occurred, the mobile communication terminal proceeds to step 303. In step 303, the mobile communication terminal determines a target frequency band in a predetermined manner. The target frequency band may be determined by the modem. In step 305, the mobile communication terminal outputs a frequency control signal indicating the target frequency band.

In step 307, the mobile communication terminal performs a switching operation by the RF switch module according to the frequency control signal to determine one of a plurality of TX/RX paths for processing TX/RX signals. That is, the mobile communication terminal connects the antenna to one of the TX/RX paths. In step 309, the mobile communication terminal performs a switching operation by the switch according to the frequency control signal to change the resonance frequency of the antenna. Herein, if the frequency control signal indicating the target frequency band is outputted through a plurality of signal lines, a logical operation may be performed on signals received from some of the signal lines as illustrated in FIGS. 5A, 5B, 6A and 6B and the switching operation of the switch may be performed according to a result signal of the logic operation.

Although it has been described that steps 305 and 307 are performed sequentially, steps 305 and 307 may be performed simultaneously or may be performed in a reverse order.

Thereafter, the mobile communication terminal transmits/receives signals in step 311 and returns to step 301.

According to exemplary embodiments of the present invention, the mobile communication terminal may include additional and/or different components, or omit any number of the components shown in FIGS. 2, 5B, and 6B. Similarly, the functionality of two or more components may be integrated into a single component.

As described above, exemplary embodiments of the present invention share the control signal between the RF switch module for connecting the antenna to one of the TX/RX paths and the switch for varying the resonance frequency of the antenna, and control the TX/RX paths and the antenna resonance frequency according to one control signal outputted from the modem, thereby making it possible to reduce the number of output ports of the modem to reduce the size of the mobile communication terminal. Also, exemplary embodiments of the present invention remove an operation of synchronizing the timing of the control signal of the switch and the RF switch module, thus making it possible to reduce the load of the modem and reduce the complexity in the production and development of the mobile communication terminal.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An apparatus for controlling a multi-band antenna in a mobile communication terminal, the apparatus comprising:

a modem configured to determine a target frequency band when a change event occurs, and to output a plurality of control signals indicating the target frequency band;

at least one circuit configured to combine the plurality of control signals and to output a signal based on the combined control signals;

a Radio Frequency (RF) processing unit including a plurality of transmission/reception (TX/RX) paths configured to process TX/RX signals;

an antenna unit including an antenna and a switch, the switch being configured to change a resonance frequency of the antenna according to the signal output from the at least one circuit, and the antenna being configured to support multiple bands, and to transmit/receive signals according to the resonance frequency; and an RF switch module configured to connect the antenna to one of the TX/RX paths according to the plurality of control signals, wherein the plurality of control signals is shared between (i) the RF switch module for connecting the antenna to the one of the TX/RX paths and (ii) the switch for changing the resonance frequency of the antenna.

2. The apparatus of claim 1, wherein the antenna unit receives the plurality of control signals through a plurality of signal lines branching from at least one signal line through which the modem outputs the plurality of control signals to the RF switch module.

3. The apparatus of claim 1, wherein the circuit receives a predetermined number of the plurality of control signals, and outputs a result of a logic operation performed on the received predetermined number of control signals to the switch.

4. The apparatus of claim 1, wherein the circuit comprises an AND logic circuit.

5. The apparatus of claim 1, wherein the circuit comprises a NOR logic circuit.

6. The apparatus of claim 3, wherein the predetermined number of control signals is less than the plurality of control signals.

7. A method for controlling a multi-band antenna in a mobile communication terminal including an antenna unit including a switch and the multi-band antenna, the method comprising:

determining, by a modem, a target frequency band when a change event occurs;

outputting, by the modem, a plurality of control signals indicating the target frequency band;

combining, by at least one circuit, the plurality of control signals;

outputting, by the at least one circuit, a signal based on the combined control signals;

changing, by the switch of the antenna unit, a resonance frequency of the multi-band antenna according to the signal output from the at least one circuit;

transmitting/receiving signals according to the resonance frequency; and connecting, by a Radio Frequency (RF) switch module, the multi-band antenna to one of a plurality of transmission/reception (TX/RX) paths, wherein plurality of control signals is shared between (i) the RF switch module for connecting the antenna to the one of the TX/RX paths and (ii) the switch for changing the resonance frequency of the antenna.

8. The method of claim 7, further comprising receiving, by the antenna unit, the plurality of control signals through a plurality of signal lines branching from at least one signal line through which the modem outputs the plurality of control signals to the switch module.

9. The method of claim 7, wherein the circuit receives a predetermined number of the plurality of control signals, and outputs a result of a logic operation performed on the received predetermined number of control signals to the switch.

10. The method of claim 7, wherein the circuit comprises an AND logic circuit.

11. The method of claim 7, wherein the circuit comprises a NOR logic circuit.

12. The method of claim 9, wherein the predetermined number of control signals is less than the plurality of control signals.

* * * * *